(No Model.) 3 Sheets—Sheet 1.
F. V. WINTERS.
GARBAGE RECEPTACLE.
No. 581,322. Patented Apr. 27, 1897.
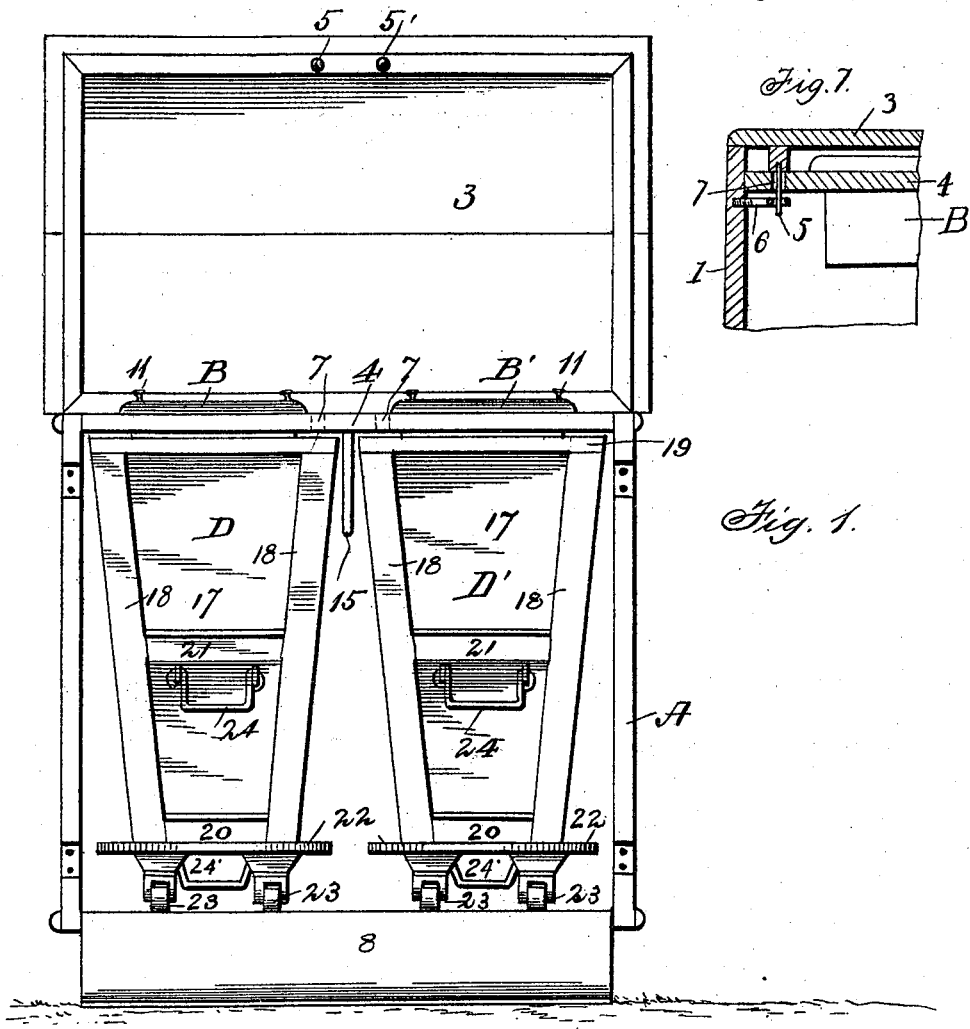
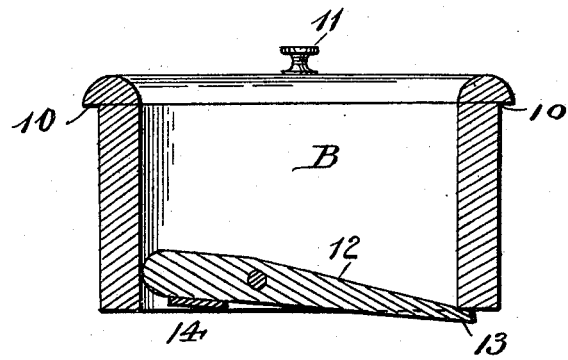

(No Model.) 3 Sheets—Sheet 2.
F. V. WINTERS.
GARBAGE RECEPTACLE.

No. 581,322. Patented Apr. 27, 1897.

Witnesses  Inventor
  Fred'k V. Winters
  by A. G. Heymann,
    Attorney (No Model.) 3 Sheets—Sheet 3.

F. V. WINTERS.
GARBAGE RECEPTACLE.

No. 581,322. Patented Apr. 27, 1897.

Witnesses
F. L. Ourand
Geo. H. Evans

Inventor
Fred'k V. Winters
by A. G. Heyfman
Attorney

UNITED STATES PATENT OFFICE.

FREDERICK V. WINTERS, OF NEW YORK, N. Y., ASSIGNOR OF ONE-HALF TO JOHN A. YORK, OF SAME PLACE.

GARBAGE-RECEPTACLE.

SPECIFICATION forming part of Letters Patent No. 581,322, dated April 27, 1897.

Application filed September 25, 1896. Serial No. 606,923. (No model.)

*To all whom it may concern:*

Be it known that I, FREDERICK V. WINTERS, a citizen of the United States of America, residing in New York city, in the State of New York, have invented a new and useful Garbage-Receptacle, of which the following is a specification.

My invention has relation to improvements in garbage-receptacles; and the object is to provide a vessel or receptacle for the uses intended which is simple, strong, and durable in construction and which is convenient in use and secure against unwarranted intrusion.

I have fully and clearly illustrated the invention in the accompanying drawings, forming a part of this specification, wherein—

Figure 2:
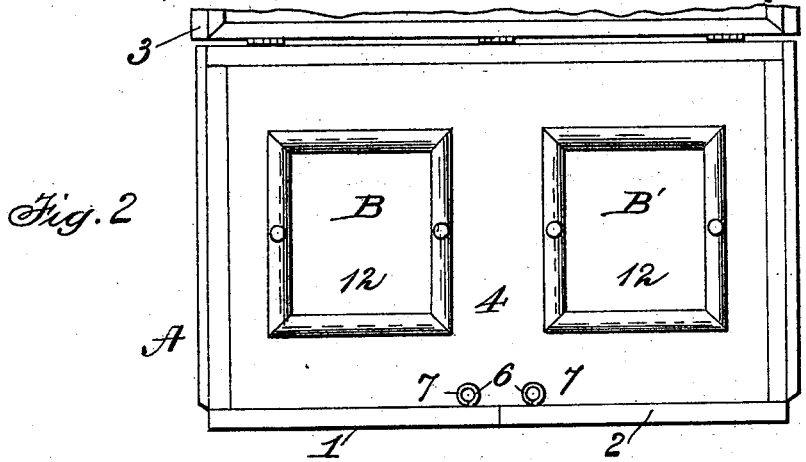
Figure 6:
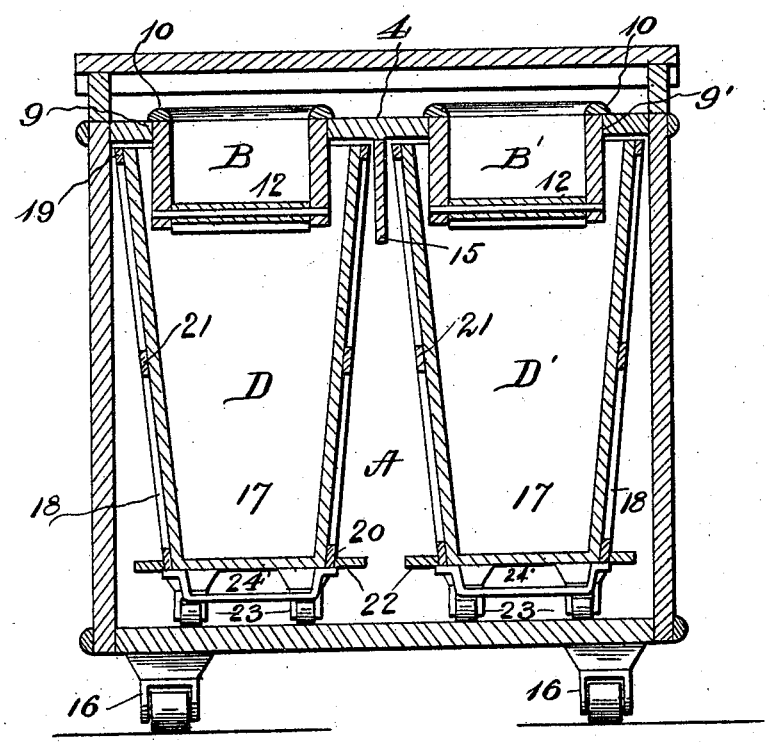
Figure 5:
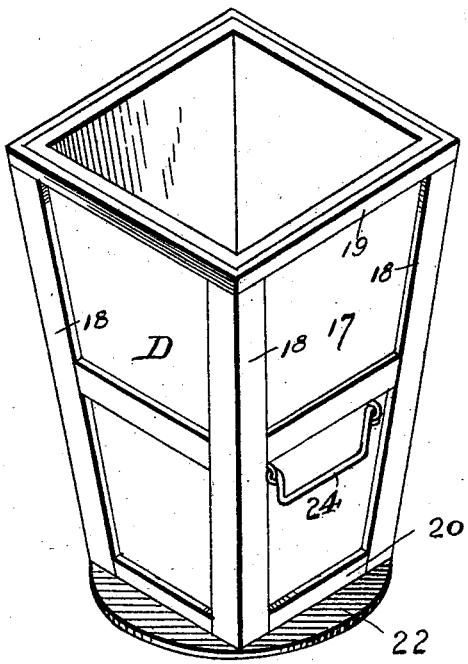
Figure 3:
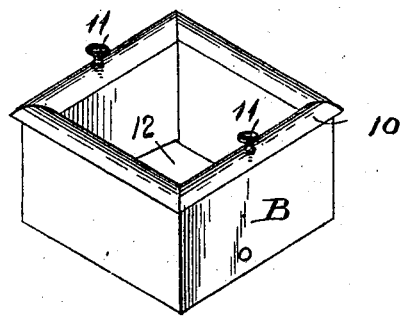

Figure 1 is a front view in elevation of the cabinet or casing of the receptacle, the doors being removed to show the arrangement of the receptacles, and also showing the swinging hinged leaf down which the receptacles ride when being removed from the casing, and showing the lid of the casing lifted. Fig. 2 is a plan view of the casing, showing the chute-boxes arranged therein and the tilting bottoms thereto. Fig. 3 is a detail perspective of one of the chute-boxes removed from the casing. Fig. 4 is a vertical central section through one of the chute-boxes. Fig. 5 is a perspective of one of the receptacles. Fig. 6 is a vertical section through the casing and the receptacles. Fig. 7 is a detail of the locking means.

It will be premised that while I have illustrated the casing as made to contain duplicate receptacles, one of which can be used for garbage and the other for ashes and refuse material interdicted from being deposited with the garbage, it is readily perceived that the invention may be applied to a casing made to contain a single receptacle.

Referring to the drawings, A designates a casing made in the form of a rectangular box of sufficient dimensions and capacity to take in the receptacle or receptacles, substantially as shown in the drawings. To the front of the casing are hinged the doors 1 2, which close the front of the casing, and to the top of the casing is hinged a lid or cover 3, which closes down over the top plate or board 4 of the casing and at the same time serves to cover the chute-boxes. In the closing edge of the lid are secured two pins 5 5', which pass through staples or eyes 6 in the doors and project into holes 7 in the top of the casing, so that when the doors are closed the lid may be also closed, and the pins lock the doors in closed position. Then by means of a suitable lock, as a hasp and staple and padlock, the lid is locked against being raised and the receptacles secured from removal. To the bottom of the casing, at the front edge thereof, is hinged a track-board 8, on which the receptacles ride when being removed or when replaced. This track-board, when turned down and outward, stands at an incline and is so connected to the casing that it will turn up and back in the casing out of the way of the doors when they are closed.

In the top plate or board of the casing, which is permanently fixed in and covers the main box, are formed two openings 9 9', preferably square, as shown, and opening into the casing. In the openings 9 9' are disposed the chute-boxes B B'. These chute-boxes consist of rectangular cases open at top and bottom, and are provided with outwardly-extending edge flanges 10, which rest on the edges of the top around the openings 9 9', and are thus sustained and prevented from passing farther down in the receptacles. Any suitable handles or bails may be secured to the chute-boxes, as knobs 11, by which they may be lifted from their seats in the casing when it is necessary to remove the receptacles. The chute-boxes are provided with tilting bottoms 12, turning on bearings journaled across the boxes, substantially as shown, the bearings being preferably disposed at a point to one side of the middle or center of the tilting bottoms, so that when the material is poured or deposited it will tilt the bottoms and slide down into the receptacles.

To insure the operation of the tilting bottoms, the upper surface is inclined, as shown, and the edge, as at 13, projects under and lodges against the edge of the chute-box. To restore the bottoms of the chute-boxes to their closed positions, a weight, as a plate 14, is secured to them. In the casing projecting down from the middle of the tops 4 is secured a partition piece or plate 15, which keeps the receptacles from colliding when one of them is being removed or replaced. The casing is preferably mounted on wheels or casters 16 to facilitate moving it whenever desired.

D D' designate the receptacles, duplicates in construction. These consist of rectangular bodies 17, made tapering from top to bottom, the bodies being braced and strengthened by vertical angle-irons 18 at the corners, connected at the top and bottom by similar pieces 19 20 and intermediate cross-pieces 21, extending on all sides of the bodies, substantially as shown in the drawings. At the bottoms are formed circular flanges 22, extending around the receptacles, which serve as supports on which the receptacle may be rolled after being removed from the casing, and to be used should the supporting-casters 23 become broken. Handles or bails 24, one being shown, are secured on the opposite sides of the receptacles, by which they are carried and handled. On the bottom of the receptacle is a handle 24', to be used in tilting and emptying them.

To use the device, the casing is placed where required. The receptacles are then put in the casing, and then the chute-boxes are arranged in the openings provided for them and the device is ready to receive material. When the material has been deposited, the doors are closed and the lid shut down and the lock applied. The device so remains until further deposit is to be made, when the cover is unlocked and raised and the deposit made. When the garbage is to be removed, the device is unlocked and opened, the chute-boxes lifted out, and then the receptacles can be drawn out, their withdrawal turning down the track-board and placing it in position for the use intended, or the track-board may be first turned down after the doors have been opened. The receptacles after being emptied are replaced, the track-board turned up, the chute-boxes replaced, the doors shut, and the lid closed and locked.

What I claim, and desire to secure by Letters Patent, is—

1. In a garbage-receptacle, an outer casing, comprising a rectangular box open on one side, a door to close the open side, a top board on the casing constituting the cover therefor, provided with an opening therein, a chute-box detachably arranged in the said opening, a tilting bottom in the chute-box, and a lid to cover the top board of the casing and chute-box.

2. In a garbage-receptacle, an outer casing comprising a rectangular box open on one side, a door to close the open side, a top board covering the casing provided with an opening therein, a chute-box arranged in the said opening, a tilting bottom in the chute-box, a lid to cover the top of the casing and chute-box, and a track-board hinged to the bottom of the casing and adapted to turn back into the casing and away from the doors when closed.

3. A garbage-receptacle, comprising an outer casing, consisting of a rectangular box, open on one side, doors to close the open side, a top board covering the casing provided with openings therein, chute-boxes in the openings, tilting bottoms in the chute-boxes, a lid to cover the top of the casing and chute-boxes, and a track-board hinged to the bottom of the casing, and garbage-receptacles in the casing.

4. In a garbage-receptacle, the casing A having a top provided with pin-holes adjacent to its front edge, doors provided with staples or eyes to register with the said pin-holes, and a lid having pins on its under front edge to pass through the eyes in the doors and engage in the pin-holes in the casing.

5. The garbage-receptacle herein described, comprising a rectangular body tapering from top to bottom, angle-irons embracing the corners of the body, top and bottom cross-pieces connecting the angle-irons, intermediate cross-pieces, a circular flange at the bottom of the body, bails on opposite sides of the body, and a handle on the bottom of the receptacle, substantially as described.

In witness whereof I have hereto set my hand in the presence of two attesting witnesses.

FREDERICK V. WINTERS.

Attest:
CLARENCE G. HUGHNUN,
JNO. A. YORK.